United States Patent [19]

Basler et al.

[11] 4,239,183
[45] Dec. 16, 1980

[54] HANDLE ASSEMBLY FOR BOTTOM OUTLET VALVE

[75] Inventors: Glennon L. Basler; Richard J. Wempe, both of St. Charles, Mo.

[73] Assignee: ACF Industries, Incorporated, New York, N.Y.

[21] Appl. No.: 961,372

[22] Filed: Nov. 16, 1978

[51] Int. Cl.³ .................. F16K 35/00; F16K 27/03
[52] U.S. Cl. ................................. 251/144; 251/98
[58] Field of Search ............... 251/144, 98, 292; 137/347, 350

[56] References Cited

U.S. PATENT DOCUMENTS

| 871,869 | 11/1907 | Gordon | 251/292 |
|---|---|---|---|
| 4,124,193 | 11/1978 | Reedy | 251/292 |

FOREIGN PATENT DOCUMENTS 512701  10/1920  France ..................... 137/383

*Primary Examiner*—William R. Cline
*Attorney, Agent, or Firm*—Henry W. Cummings

[57] ABSTRACT

An inexpensive captive operating handle assembly for a bottom operated railway tank car lading valve includes an operating shaft for a bottom operated tank car closure valve. The handle assembly includes a handle connection portion having a non-round slot adapted to engage a valve closure shaft non-round connection portion. An adapter plate is held captive by the outlet chamber and the shaft non-round connection portion. A shaft portion of the handle extends upwardly and away from the connection portion, and is held in place by a bracket located on the outlet chamber or on the tank car. In stored position, the handle connection portion is spaced below the shaft connection portion. The handle is pivotal about a hinge to an engaged position in which the handle connection portion abuts the lower surface of the adapter plate and in which the handle connection portion engages the non-round operating shaft portion to move the valve closure between open and closed positions. The handle is then returned to the stored position after use.

8 Claims, 3 Drawing Figures

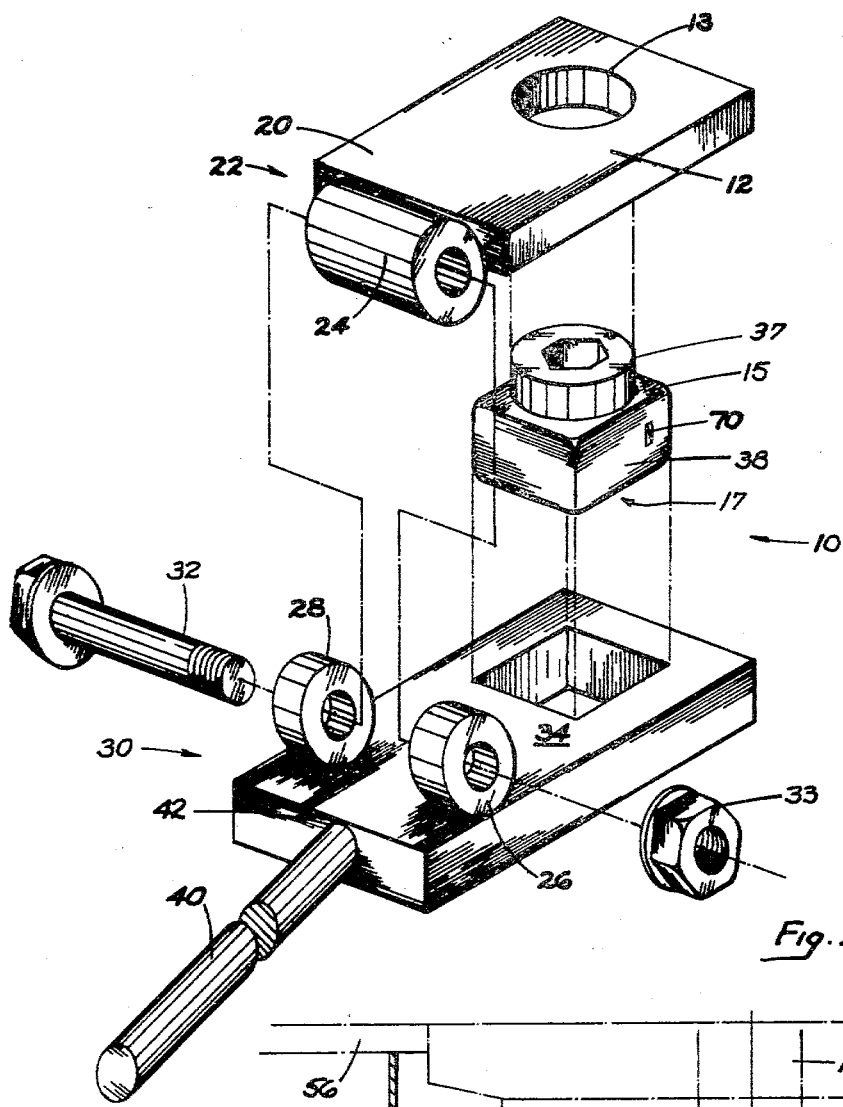
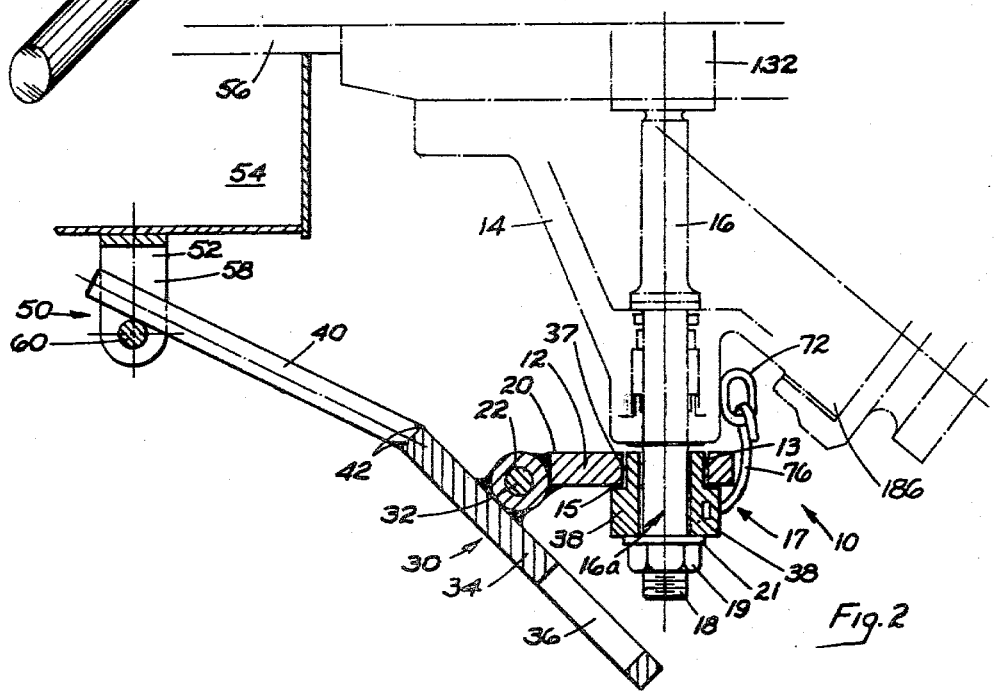
Fig. 1
Fig. 2

HANDLE ASSEMBLY FOR BOTTOM OUTLET VALVE

BACKGROUND OF THE INVENTION

In application Ser. No. 955,966 filed Oct. 30, 1978, assigned to the same assignee as the present application, a captive handle assembly for a bottom operated tank car valve assembly is disclosed. In this application, an operating handle having a non-round handle connection portion is pivotably mounted on the outlet chamber adjacent a non-round connection portion of a vertically extending valve closure operator. The distal end of the handle is held captive by a mounting bracket attached to the upper portion of the outlet chamber or to the tank car.

In one embodiment the handle is movable laterally relative to the shaft connection portion so that the handle connection portion can engage the shaft connection portion.

In another embodiment a ratchet assembly on the handle is used to engage the non-round connection portion of the operating shaft. This ratchet assembly is particularly expensive.

SUMMARY OF THE INVENTION

The object of the present invention is to provide an inexpensive captive operating handle assembly for a bottom operated railway tank car lading valve.

The operating assembly includes an operating shaft for a bottom operated tank car closure valve. The operating shaft includes a lower shaft non-round connection portion located adjacent the outlet chamber.

An adapter plate surrounds the shaft with clearance and is held captive by the outlet chamber and the shaft non-round connection portion. The adapter includes a hinge attached to the outer end of the adapter.

An operating handle is pivotably mounted on the adapter with the hinge. The operating handle includes a handle connection portion having a non-round slot adapted to engage the shaft non-round connection portion. A shaft portion of the handle extends upwardly and away from the connection portion, and is held in place by a bracket located on the outlet chamber or on the tank car. In a stored position, the handle connection portion is spaced below the shaft connection portion. The handle is pivotal about the hinge to an engaged position in which the handle connection portion abuts the lower surface of the adapter plate and in which the handle connection portion engages the non-round operating shaft portion to move the valve closure between open and closed positions. The handle is then returned to the stored position.

THE DRAWINGS

FIG. 1 is a cut-away perspective view of the operating handle assembly of the present invention;

FIG. 2 is a side elevation view of the operating handle of the present invention;

DESCRIPTION OF PREFERRED EMBODIMENTS

Figure 3:
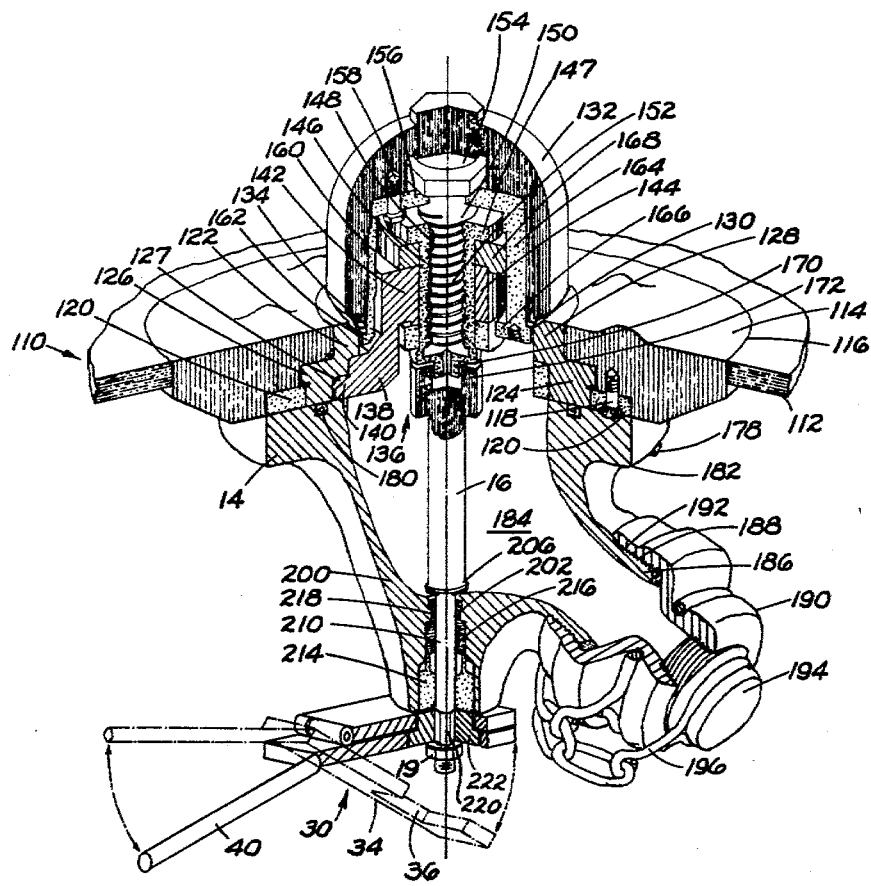
FIG. 3 is a detail view illustrating a suitable valve closure assembly to be used with the handle assembly of the present invention, and illustrating the handle assembly in engaged and disengaged positions.

The operating handle assembly of the present invention is indicated in the drawings generally at 10. The assembly includes an adapter 12 having a slot 13 which rests on a shoulder 15 defined by a connection element 17 having a cylindrical portion 39 and non-round connection portion 38. An outlet chamber 14 includes an operating shaft 16 which is rotatable to move a valve closure 132 between open and closed positions as described in greater detail in application Ser. No. 955,966 filed Oct. 30, 1978, hereby incorporated into the present application by this reference. Adapter 12 has mounted at its outer end 20 a hinge 22. Hinge 22 includes a lug 24 mounted upon the adapter.

A pair of cooperating lugs 26 and 28 are provided on an operating handle assembly indicated generally at 30. A pin 32 extends through the respective lugs 24, 26 and 28 held in place with a nut 33 to hingedly mount the handle assembly 30 about the adapter 12. The handle assembly 30 includes a lower connection portion 34 having an opening therein 36. Operating shaft 16 is provided with a non-round portion 16a and a threaded portion 18. A nut 19 and a washer 21 hold in place a non-round connection portion 38. Handle connection portion 34 is pivotable about the hinge pin 32 to a generally horizontal position wherein the non-round opening 36 of the handle engages the non-round connection portion 38 attached to the operating shaft. In this position, connection portion 34 abuts adapter 12 which provides an engaged position stop.

Handle assembly 30 further includes a handle portion 40 which is welded at 42 to connection portion 34. When connection portion 34 abuts adapter 12, handle portion 40 extends downwardly and generally horizontally relative to pivot pin 32. In this position, handle portion 40 may be used to rotate non-round connection portion 38 and shaft 16. When an unloading conduit is attached to unloading spout 186, it may be necessary to move non-round handle connection portion 38 into and out of engagement with non-round connection portion 38 as the handle approaches abutting the unloading conduit. If the unloading conduit is provided with a 90° elbow, it may be possible for the handle to be rotated 360° below the unloading conduit.

Handle 40 extends upwardly and is adapted to be held in place by a suitable bracket assembly 50 attached to the tank car.

Bracket assembly 50 includes a generally "U"-shaped bracket 52 welded to an insulating jacket 54 depending from the tank bottom 56. In stored position handle 40 is held in place by a pin 60 extending between arms 58 of the bracket 52. Reference may be made to application Ser. No. 955,966 filed Oct. 30, 1978, for alternative bracket construction.

An opening 70 may be provided in connection portion 38 and a chain link 72 welded to outlet chamber 14. A railroad seal 76 may be passed therethrough.

Application Ser. No. 955,966 filed Oct. 30, 1978, may be referred to for a detailed explanation of the operation of a suitable closure valve assembly.

Briefly, in the drawings a railway tank car 110 includes a tank bottom 112. A tank car universal flange 114 is welded to an opening 116 in the tank bottom. Countersunk fasteners 118 extending into universal flange 114 hold in place a valve seat retainer 120.

A valve seat member 122 includes a body portion 124 having an outwardly extending flange 126, the lower portion of which is engaged by the seat retainer 120. An upper valve seat portion 128 includes an inclined valve seat surface 130. A valve closure 132 having a seal 134 is movable vertically relative to valve seat portion 128 by means of an operating assembly indicated generally at 136.

While a wide variety of operating assemblies may be used, one suitable operating assembly 136 includes a retainer 138 having outwardly extending lugs 140 which engage slots 127 in valve seat member 122, and an upper radial portion 142 which terminates in a hub 144 which engages a vertically extending upper operator 146. Upper operator 146 includes an upper flange 147, is internally threaded at 148, and engages a depending closure shaft 150 which is externally threaded at 152. Closure shaft 150 includes a head portion 154 which is maintained in place within closure 132 by a depending member 156 which engages the lower surface of head 154 and which is held in position by fasteners 158. Depending member 156 includes a cylindrical portion 160 having outwardly directed flanges 162 which hold in place seal member 134. Cylindrical portion 160 further includes portions 164 of increased cross section having inwardly directed flanges 166 which in open position engage stops 168 located between hub 144 and flange 147 of upper operating shaft 146.

Shaft 146 further includes a lower non-round engagement portion 170 which is adapted to be engaged by a cooperating non-round connection portion 172 of vertically extending operating shaft located in depending outlet chamber 14. Fasteners 178 located in a flange portion 182 of outlet chamber 14 hold outlet chamber 14 and a seal 180 in engagement with seat retainer 120 as is disclosed in greater detail in U.S. Pat. Nos. 4,141,535; 4,121,614; 4,158,453 and 4,198,032 each of which is incorporated into the present application by this reference.

Outlet chamber 14 is hollow having an opening 184 and an unloading spout 186. Unloading spout 186 is externally threaded as indicated at 188 and is adapted to receive a cap 190 having cooperating threads 192 and a threaded closure plug 194. A retaining chain 196 is also provided.

Outlet chamber 14 further includes an operating portion 200 having a bore 202 within which operating shaft 16 extends. Operating shaft 16 includes a shoulder 206 resting on a cooperating shoulder 208 in operating portion 200 and further includes a lower depending shaft portion 210. Depending shaft portion 210 includes non-round connection portion 220. A retainer 214 located above connection element 222 holds in place a packing 216 and an "O" ring seal 218.

In operation, with assembly 30 in the engaged position as shown in FIG. 3, rotation of handle 40 rotates non-round connection element 222, which in turn rotates shaft 16 and connection portion 170 of upper operator 136. Rotation of connection portion 170 rotates upper operator 146 and closure shaft 150. Rotation of shaft 150 initially rotates closure 132 until depending cylindrical portion 160 engages ribs 138. At this point, rotation of closure 132 ceases and the closure moves vertically to the open position. In the open position, projections 166 engage stop 168.

Rotation of handle 40 in the opposite direction initially rotates closure 132 in the opposite direction until depending cylindrical portion 160 again engages ribs 138. The closure 132 then moves downwardly until it assumes the seated position on seat 128.

The handle portion 140 is rotated until it is aligned with the bracket 50 and is then returned to the stored position shown in FIG. 2.

What is claimed is:

1. An operating handle assembly for a bottom operable railway tank car lading valve comprising:
a tank car bottom outlet chamber having an operating shaft passing therethrough to move a valve closure between open and closed positions; said operating shaft including an operating shaft non-round connection portion at its lower end; an adapter plate extending horizontally outwardly from said operating shaft connection portion and including an adapter plate opening through which said operating shaft passes with clearance; said shaft non-round connection portion comprising an upper cylindrical portion which rotates within said adapter plate opening, and a lower non-round portion and wherein said lower non-round portion defines a shoulder which supports said adapter plate; said adapter plate having a distal end; hinge means attached to the distal end; a handle assembly attached to said adapter plate with said hinge means; said handle assembly including a handle connection portion having a non-round slot adapted in one position to engage said non-round connection portion; a handle shaft portion extending upwardly and away from said handle connection portion; said handle shaft portion removably held in place by a bracket located above said shaft connection portion; whereby when said shaft handle portion is in position within said bracket, said handle connection portion is spaced below said adapter plate and said operating shaft connection portion; and whereby said handle is pivotable about said hinge means to an engaged position in which said handle connection portion abuts the lower surface of said adapter plate and said handle connection portion engages said lower non-round portion and said handle is rotatable to move the valve closure between open and closed positions, and whereby after use said handle assembly and said adapter plate are rotatable about said upper cylindrical portion without rotating said operating shaft until said handle aligns with said bracket and said handle shaft portion is reinserted in said bracket.

2. An operating handle assembly according to claim 1 wherein said handle mounting bracket is supported by said tank bottom.

3. An operating handle assembly according to claim 2 wherein said handle mounting bracket is mounted upon a gusset depending from said tank bottom.

4. An operating handle assembly according to claim 1 wherein said operating shaft connection portion comprises at least one separate element and wherein means are provided to hold said separate element in place on said operating shaft.

5. An operating handle assembly for a bottom operable railway tank car lading valve comprising:
a tank car bottom outlet chamber having an operating shaft passing therethrough to move a valve closure between open and closed positions; said operating shaft including an operating shaft non-round connection portion at its lower end; an adapter plate extending horizontally outwardly from said operating shaft and including an adapter plate opening through which said operating shaft passes with clearance; a connection element having an internal shaft non-round connection portion, an upper external cylindrical portion which rotates within said adapter plate opening, and a lower external non-round connection portion and wherein said lower external non-round portion defines a shoulder which supports said adapter plate; said adapter plate having a distal end; hinge means attached to the distal end of the adapter plate; a handle assembly attached to said adapter plate with said hinge means; said handle assembly including a handle connection portion having a non-round slot adapted in one position to engage said connection element lower external non-round connection portion; and a handle shaft portion extending upwardly and away from said handle connection portion; said handle shaft portion removably held in place by a bracket located above said shaft connection portion; and means securing said connection element to said operating shaft connection portion; whereby when said shaft handle portion is in position within said bracket, said handle connection portion is spaced below said adapter plate and said operating shaft connection portion; and whereby said handle is pivotable about said hinge means to an engaged position in which said handle connection portion abuts the lower surface of said adapter plate and said handle connection portion engages said connection element lower connection portion and said handle is rotatable to move the valve closure between open and closed positions.

6. An operating handle assembly according to claim 5 wherein said handle connection portion is inclined with respect to said handle shaft portion.

7. An operating handle assembly according to claim 5 wherein said handle mounting bracket is supported by said tank bottom.

8. An operating handle assembly according to claim 5 wherein said handle mounting bracket is mounted upon a gusset depending from said tank bottom.

* * * * *

UNITED STATES PATENT AND TRADEMARK OFFICE
CERTIFICATE OF CORRECTION

PATENT NO. : 4,239,183
DATED : December 16, 1980
INVENTOR(S) : Glennon L. Basler; Richard J. Wempe It is certified that error appears in the above-identified patent and that said Letters Patent are hereby corrected as shown below:

In Column 2, line 3, "39" should be --37--.
In Column 3, line 32, "4,121,614" should be --4,121,193--.
In Column 6, line 13, "Claim 5" should be --Claim 3--.
In Column 6, line 16, "Claim 5" should be --Claim 3--.

Signed and Sealed this

Twenty-fifth Day of August 1981

[SEAL]

*Attest:*

GERALD J. MOSSINGHOFF

*Attesting Officer*    *Commissioner of Patents and Trademarks*